United States Patent [19]

Goldburt et al.

[11] Patent Number: 4,857,978
[45] Date of Patent: Aug. 15, 1989

[54] SOLID STATE LIGHT MODULATOR INCORPORATING METALLIZED GEL AND METHOD OF METALLIZATION

[75] Inventors: Efim S. Goldburt; Richard E. Hemmer, both of Briarcliff Manor, N.Y.

[73] Assignee: North American Philips Corporation, New York, N.Y.

[21] Appl. No.: 84,260

[22] Filed: Aug. 11, 1987

[51] Int. Cl.⁴ .............................................. H01L 29/78
[52] U.S. Cl. ........................................ 357/24; 357/30; 350/360
[58] Field of Search .................. 357/24 LR, 30 L; 350/360, 355; 428/429, 447; 358/233, 234

[56] References Cited

U.S. PATENT DOCUMENTS

| | | | |
|---|---|---|---|
| 3,877,791 | 4/1975 | Roach | 350/360 |
| 4,088,991 | 5/1978 | Sachar | 350/360 X |
| 4,119,368 | 10/1978 | Yamazaki | 350/360 |
| 4,299,450 | 11/1981 | Funada et al. | 350/360 |
| 4,312,693 | 1/1982 | Salensky et al. | 428/447 X |
| 4,626,920 | 12/1986 | Glenn | 350/360 X |

OTHER PUBLICATIONS

Sax, N. I., et al., *Hawley's Condensed Chemical Dictionary*, 11th Ed., 1987, pp. 1038, 1041.

Primary Examiner—Andrew J. James
Assistant Examiner—Sara W. Crane
Attorney, Agent, or Firm—John C. Fox

[57] ABSTRACT

A solid state light modulator structure useful in a video display system includes a deformable silica containing gel layer on an array of charge storage elements, and an adherent, highly light reflective metal (e.g., Ag) electrode layer formed on the surface of the gel layer by evaporation, following treatment of the gel surface in an oxygen-containing plasma.

5 Claims, 3 Drawing Sheets

SOLID STATE LIGHT MODULATOR INCORPORATING METALLIZED GEL AND METHOD OF METALLIZATION

CROSS-REFERENCE TO RELATED APPLICATION

Co-pending U.S. patent application, Ser. No. 084,262 filed concurrently herewith, claims a method for metallizing a silica-containing gel by sputtering, and a solid state light modulator incorporating the metallized gel.

BACKGROUND OF THE INVENTION

This invention relates to a solid state light modulator structure useful in an apparatus for generating an image from a video input signal, and more particularly relates to such a structure including a deformable metallized elastomer layer, and also relates to a method for metallizing the layer.

U.S. Pat. No. 4,626,920 describes a video display system of the type employing solid state light modulator structures including a deformable, metallized elastomer layer. In this light modulator structure, the deformable layer, for example, a metallized silica-containing gel layer, is disposed over an array of electrodes on the surface of a solid state charge storage device, such as a charge coupled semiconductor device. The metal layer on the surface of the gel serves both as an electrode and as a light reflecting layer.

In operation, electric fields associated with the charge pattern of a stored video frame cause electrostatic attractions between the electrode array and the surface electrode, resulting in deformation of the gel layer in a pattern corresponding to the charge pattern. This pattern is analagous to a phase diffraction grating. The information contained in this pattern is then "read" by reflecting light from the deformed electrode into an optical subsystem such as a Schlieren type of optical system, which then translates the information into a viewable image on a screen.

A critical step in the formation of these light modulator structures is the formation of the light reflective electrode layer on the gel surface. In order for the device to operate successfuly, such layer must be electrically conductive, flexible and adherent to the gel layer, and is preferably highly specularly reflective. Unfortunately, since gels are semi-solids, having structures which may be characterized as having a liquid phase distributed in an open polymer network, they provide poor surfaces for adhesion.

In the referenced U.S. patent, an electrode layer with the desired characteristics is provided by first providing a thin pellicle layer of nitrocellulose on the gel surface, to provide a surface for adhesion, and to isolate the electrode layer from gel components which could attack and degrade it. Next, a thin intermediate layer of gold is evaporated onto the pellicle layer, followed by evaporation of a thin silver layer onto the gold layer. The gold layer enables the deposition of the silver layer with sufficient uniformity to result in a highly reflective layer.

While it would be desirable from the standpoint of manufacturing efficiency to eliminate the intermediate pellicle and gold layers, it has been found that the deposition of silver directly onto the gel surface by evaporation results in an extremely low specular reflectance, that is, less than one percent. G. C. Martin et al., J. Appl. Phys. 53 (1), 797 (1985).

Accordingly, it is a principal object of the invention to provide a solid state light modulator structure of the type described herein having an adherent, highly reflective metal layer on the surface of the gel layer.

It is another object of the invention to provide a method for forming an adherent, highly reflective metal layer onto a silica-containing gel surface without the need for forming an intermediate or transitional metal layer.

SUMMARY OF THE INVENTION

In accordance with the invention, there is provided a solid state light modulator structure comprising:

(a) a solid state charge storage device comprising an array of charge storage elements formed in a semiconductor substrate, each element associated with at least one display electrode on the surface of the substrate, (b) a deformable elastomer layer disposed on the surface of the charge storage device, the layer covering the array of display electrodes, (c) a thin pellicle layer on the surface of the elastomer layer, and (d) a flexible, adherent and light reflective conductive metal layer disposed over the pellicle layer, characterized in that the elastomer layer is a silicon and oxygen containing gel, and the pellicle layer is a silicon oxide layer bonded directly to the gel layer.

Such a solid state light modulator structure is further characterized in accordance with the invention in that the metal layer is selected from the group consisting of silver, aluminum and indium, and is preferably silver, having a specular reflectance of visible light of at least 90 percent.

In accordance with another aspect of the invention, there is provided a method for forming an adherent, light reflective metal layer directly onto the surface of a silicon and oxygen gel, the method comprising pretreating the surface with an oxygen-containing plasma, followed by forming the metal layer on the gel surface such as by evaporation.

Such a plasma treatment alters the chemistry of the gel surface, by promoting the formation of an $SiO_x$ layer (herein pellicle layer), which may be characterized as an open network of silicon and oxygen atoms, covering from about 50 to 95 percent of the gel surface, which provides sufficient structural integrity for the subsequent formation of an adherent, highly specularly reflective metal layer. Depending upon the viscoelastic properties of the gel, complete conversion of the gel surface to such an $SiO_x$ layer is generally to be avoided, since it has been observed to result in shrinking of the layer leading to an uneven surface and/or cracks. The extent of the $SiO_x$ layer increases with increasing treatment time. Also, increased flow rates of the plasma gas, increased amount of oxygen in the gas, as well as greater elasticity of the gel all generally result in increased rate of formation of the $SiO_x$ layer.

The metal layer is adherent to the treated gel surface and highly reflective. Where the metal is silver, layers having specular reflectances greater than 90 percent are obtainable.

As used herein, the term "oxygen-containing plasma" means a plasma containing at least 5 percent by volume of oxygen, remainder a gas which is non-reactive with the gel surface, such as an inert gas.

DESCRIPTION OF THE PREFERRED EMBODIMENTS

Figure 1:
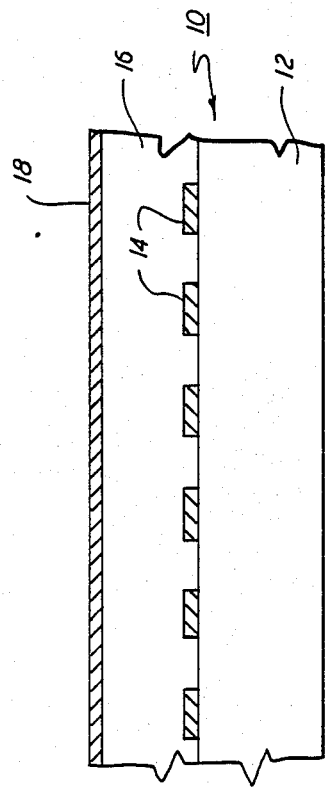
FIG. 1 is a cross-section view of one embodiment of a solid state light modulator structure in accordance with the invention.

In FIG. 1, a solid state light modulator 10 comprises a charge storage device including semiconductor substrate 12, such as silicon, including an array of charge storage elements (not shown) formed in the substrate, each charge storage element associated with at least one display electrode 14 on the substrate surface. Such a charge storage device may, for example, comprise a charge coupled device. A detailed description of the structure and operation of these devices is unnecessary to an understanding of this invention, and may be found, for example, in U.S. Pat. No. 3,882,271.

Disposed over the top of the charge storage element array is a deformable elastomer layer 16, herein a silicon and oxygen containing gel. The top surface of this gel layer 18 has been converted by pretreatment in an oxygen-containing plasma into a thin, pellicle layer (not shown) of $SiO_x$, where x is about 2. An adherent, light reflective metal electrode layer 18 is disposed on the surface of this pellicle layer, completing the light modulator.

In operation, a charge array stored in the light modulator structure representing for example, a video frame, in conjunction with a potential applied between the array of display electrodes and the upper light reflective electrode layer, results in a variation of potential across the gel layer 16, and electrostatic attraction forces between the electrode array 14 and the light reflective electrode 18, causing deformation of gel layer 16 and reflective layer 18. Such deformation results in a rippled pattern on the surface of the gel and the light reflective layer 18, which pattern can then be "read" by reflecting light from the surface into a Schlieren optical system, which translates the pattern into a visual display image. Such an optical system and its operation are described in more detail in the above-referenced U.S. Pat. Nos. 4,626,920 and 3,882,271.

As may be appreciated, the successful and efficient operation of the modulator structure is dependent upon the electrode layer 18 having sufficient flexibility and sufficient adherence to the gel surface so that it faithfully reproduces the deformations in the gel layer 16. In addition, the electrode layer 18 is preferably highly specularly reflective, so that the largest possible amount of light incident on the surface is reflected back into the optical system for display of the stored image.

However, attempts to simply evaporate a metal layer such as silver onto the surface of a silicon and oxygen containing gel such as a polydimethyl siloxane (PDMS), results in poor adhesion to the surface and a very low specular reflectance (less than one percent). In accordance with the teachings of the invention, it has been discovered that pretreating the gel layer with an oxygen-containing plasma prior to evaporation of the metal layer results in an evaporated layer which is highly specularly reflective (greater than 90 percent in the case of silver) and which adheres well to the gel surface. Such a layer results from a modification of the gel surface by the plasma, by forming a thin layer of silicon oxide, $SiO_x$, where x is about 2. The $SiO_x$ layer is believed to provide a smooth, more rigid surface for improved adherence of the evaporated metal layer.

Pretreatment times will in general range from about 5 to 25 seconds.

The gel layer should have a modulus of elasticity within a range to allow the required amount of deformation, which is determined by device geometry as well as the wavelength of the light to be modulated. By way of example, red light having a wavelength of from about 550 to 570 nanometers may be modulated in a structure having a gel layer about 10 microns in thickness and having a modulus of elasticity between about $10^4$ and $10^6$ dynes per square centimeter. When a field of about 50 volts is impressed across the gel layer between the electrode array on the surface of the semiconductor and the flexible metal electrode on the surface of the gel, an electrostatic attraction results in deformation of the gel by an amount of up to about 0.2 micrometers.

Particularly suitable for use as the gel layer in these structures are polydimethyl siloxanes (PDMS), which may be readily synthesized by curing a mixture of A and B components, where A is dimethylvinyl terminated polydimethyl siloxane and B is trimethyl terminated siloxane with partially hydrogen-substituted methyl side groups. These components are commercially available, for example, from the Dow Chemical Company under the tradename Dow Sylgard 527. Gels having various moduli of elasticity may be synthesized simply by varying the weight ratio of A to B. For example, varying the weight ratio of A:B from 1:1 to 1:2 results in a modulus of elasticity variation of approximately an order of magnitude. As is known, the modulus of elasticity may also be varied by changing the molecular weight of the A component, and by changing the functionality of the B component, defined as the number of H side groups, for example, by washing or fractionation.

In addition, raising the molecular weight of the A and B components is advantageous in that it reduces the amount of oligomers in the gel, which could otherwise diffuse to the gel surface, particularly upon formation of the metal layer, which results in a lowering of the vapor pressure over the gel. Such diffusion may shift the equilibrium of the gel toward the liquid phase, and interfere with the interface between the metal layer and the $SiO_x$ and gel layers.

EXPERIMENTAL

Sample Preparation

Dow Sylgard 527 compounds were used for the synthesis of PDMS gels with A:B weight ratios of 1:1, 1:1.5, and 1:5. The average molecular weight distribution of both A and B components was broad and centered around 20,000 grams/mole. The functionality of the B component was about $10^2$. The components were mixed in the liquid state and formed into thin layers by spinning (for 30 seconds at 3000 rpm) onto 17×17 millimeter monoscope substrates. The layers were gelled by curing them at a temperature of about 100° C. for a time of about one hour. The thickness of the cured layers was about 10 micrometers.

The 1:1, 1:1.5 and 1:5 samples were treated in a 100% oxygen gas plasma. Gas flow rates were 100 cubic centimeters per minute. Plasma conditions were 350 volts (D.C.) of potential and 50 milli-Torr of gas plasma pressure. Treatment times ranged from about 15 to 300 seconds.

Silver layers about 0.040 to 0.10μm in thickness were then evaporated onto treated and untreated gel (A:B ratio of 1:1.5) layers using an NCR 3117 evaporator.

The degree of gelation was determined by the following procedure. First, the polymer liquid fraction of the gel was washed out with THF (tetrahydrofuran) or toluene solvents until a constant weight of residue was achieved. Then the degree of gelation was determined by comparison of the remaining polymer network weight fraction (residue) to that of the initial gel. A higher B component concentration corresponds to a higher degree of gelation. Results are listed in Table I.

TABLE I

| Proportion of A | Proportion of B | Solvent | Degree of Gelation (%) | Solvent | Degree of Gelation (%) |
|---|---|---|---|---|---|
| 1.0 | 1.0 | THF | 70 | Toluene | 73 |
| 1.0 | 1.5 | THF | 78 | Toluene | 75 |
| 1.0 | 2.0 | THF | 75 | Toluene | 73 |
| 1.0 | 5.0 | THF | 74 | Toluene | 78 |
| 1.0 | 10.0 | THF | 83 | Toluene | 79 |
| 1.0 | 20.0 | THF | 88 | Toluene | 88 |

Surface reflectivity of the evaporated silver layers was measured using a 4 uW Helium-Neon laser at near perpendicular incidence. Reflectivities, treatment times, and A to B ratios of these samples are shown in Table II.

TABLE II

| Sample Number | Ratio of A to B | Surface Treatment Time | Ag Thickness | Specular Reflectivity (%) ±3% |
|---|---|---|---|---|
| 3 (a) | 1.0/1.0 | 15 Sec. | 0.10μ | 73 |
| 3 (b) | 1.0/1.0 | 30 Sec. | 0.10μ | 28 |
| 3 (c) | 1.0/1.0 | 60 Sec. | 0.10μ | <1 |
| 3 (d) | 1.0/1.0 | 90 Sec. | 0.10μ | <1 |
| 3 (e) | 1.0/1.0 | 300 Sec. | 0.10μ | <1 |
| 3 (f) | 1.0/1.5 | 15 Sec. | 0.10μ | 90 |
| 3 (g) | 1.0/1.5 | 30 Sec. | 0.10μ | <1 |
| 3 (h) | 1.0/1.5 | 60 Sec. | 0.10μ | <1 |
| 3 (i) | 1.0/1.5 | 90 Sec. | 0.10μ | <1 |
| 3 (j) | 1.0/1.5 | 300 Sec. | 0.10μ | <1 |
| 3 (k) | 1.0/5.0 | 15 Sec. | 0.075μ | 73 |
| 3 (l) | 1.0/5.0 | 30 Sec. | 0.075μ | 28 |
| 3 (m) | 1.0/5.0 | 60 Sec. | 0.075μ | <5 |
| 3 (n) | 1.0/5.0 | 90 Sec. | 0.075μ | <1 |
| 3 (o) | 1.0/5.0 | 300 Sec. | 0.075μ | <1 |
| Std. | 1.0/5.0 | 0 Sec. | 0.075μ | <1 |

As may be seen from Table II, the highest reflectivities were achieved with the shortest treatment times. The highest reflectivity in all three (1:1, 1:1.5, and 1:5) groups of the samples was achieved in the 1:1.5 sample treated with the plasma for 15 seconds.

A scanning electron microscope operating at accelerating voltages of 15 and 30 KeV was used for studies of the gel surface morphology.

Untreated samples were covered by a 200 Angstrom thick AuPd conductive layer, to prevent charge buildup, whereas the plasma treated samples were not, due to the conductivity of SiO$_2$ being higher than that of the gel.

Figure 2A:
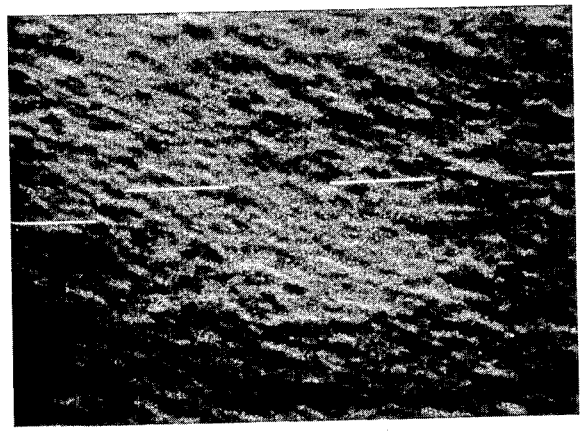
FIGS. 2 and 3 are scanning electron micrographs of gel samples before and after plasma treatment in accordance with the method of the invention.
Figure 2B:
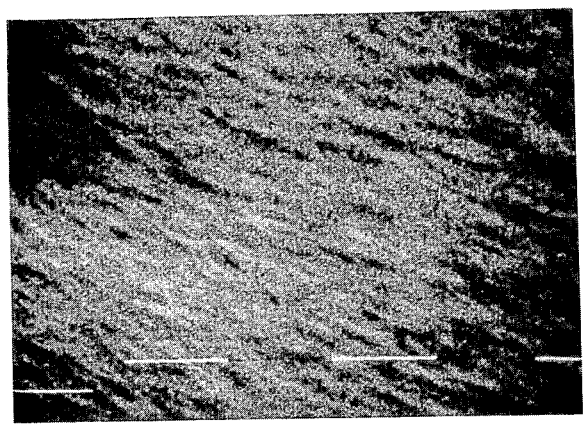
Figure 2C:
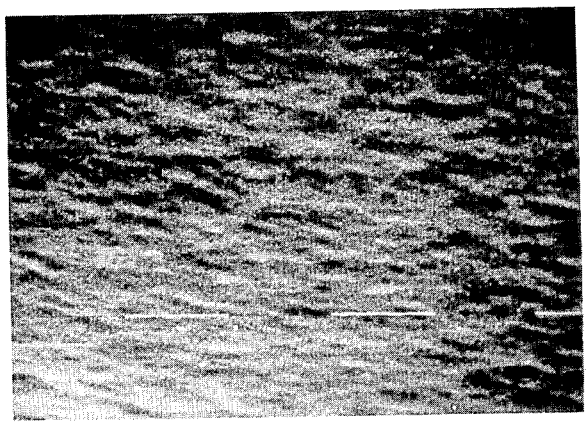

FIGS. 2(a, b and c) shows the untreated gel surface of the 1, 1:1.5, and 1:5 samples, respectively.

Figure 3A:
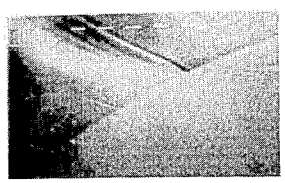
Figure 3F:
Figure 3K:
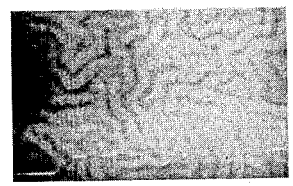
Figure 3B:
Figure 3G:
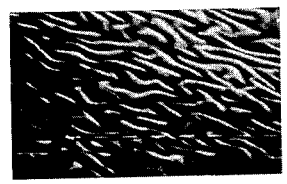
Figure 3L:
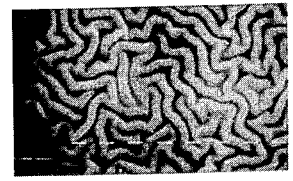
Figure 3C:
Figure 3H:
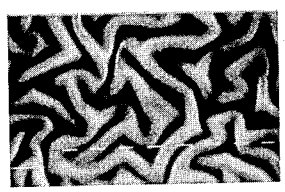
Figure 3M:
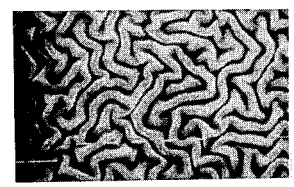
Figure 3D:
Figure 3I:
Figure 3N:
Figure 3E:
Figure 3J:
Figure 3O:
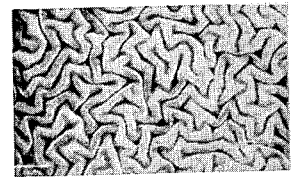

FIG. 3 shows plasma treated gel surfaces of the 1:1 [FIGS. 3(a)–(e)], 1:1.5 [FIGS. 3(f)–(j)], and 1:5 [FIGS. 3(k)–(o)] samples with treatment times of 15, 30, 60, 90 and 300 seconds. FIGS. 3(b) and (c) and FIG. 3(f) of the 1:1.5 sample have scale bars of 10 μm, while the rest of the samples have scale bars of 1 μm. Samples 1:1, [FIGS. 3(a) and (b) and 1:1.5, (FIGS. (f) and (g), were tilted at 70°.

XPS studies were conducted using an A1 K α source at 600 watts. Two survey regions were scanned (from 5 to 605 and from 600 to 1200 eV binding energy) using 0.2 eV steps at 500 milliseconds per channel and a pass energy of 50 eV. High resolution regions were recorded in the vicinity of Si 2p, Si 2s, C 1s, and O 1s peaks at a pass energy of 20 eV and 500 milliseconds per channel. The Si and O scans were recorded at 0.05 eV steps and the C scan at 0.1 eV/step.

The peak areas and positions were measured using the high resolution spectra. Since the absolute counts may vary depending on the sample position, the peaks were correlated to the Si 2s peak at 104 eV. The chemical state for the oxygen in the polymer is assumed not to vary with degree of oxidation and the peak energy was set at 532.0 eV. Using these assumptions the shift of the Si and C peaks due to charging could be eliminated and the peak positions determined. Table III shows these peak positions for Si2 2p and C 1s, as well as peak area ratios for F/Si 2p, O/So 2p, C/Si 2p and Si 2s/si 2p for the 1:1.5 samples, both untreated and treated for 15, 30, 60 and 300 seconds.

TABLE III

| Element | Untreated | 15 sec. | 30 sec. | 60 sec. | 300 sec. |
|---|---|---|---|---|---|
| F/Si 2p | — | 0.09 | 0.83 | 0.83 | 5.3 |
| O/Si 2p | 3.3 | 6.0 | 5.8 | 6.4 | 6.4 |
| C/Si 2p | 1.9 | 0.7 | 0.6 | 0.7 | 0.7 |
| Si 2s/Si 2p | 1.1 | 1.1 | 1.0 | 1.1 | 1.1 |
| Si 2p {eV} | 101.8 | 102.4 | 102.4 | 102.4 | 102.4 |
| C 1s {eV} | 284.2 | 283.9 | 284.0 | 284.0 | 284.2 |

Table IV lists the same data (except F/Si 2p) for the untreated and the 15 second treated samples with 1:1 and b 1:5 ratios of A to B respectively.

TABLE IV

| Element | 1:1 Untreated | 1:1 15 sec. | 1:5 Untreated | 1:5 15 sec. |
|---|---|---|---|---|
| O/Si 2p | 3.3 | 5.7 | 3.0 | 6.8 |
| C/Si 2p | 1.9 | 0.9 | 1.8 | 0.9 |
| Si 2s/Si 2p | 1.1 | 1.1 | 1.0 | 1.1 |
| Si 2p {eV} | 101.7 | 102.5 | 101.7 | 102.9 |
| C 1s {eV} | 284.2 | 284.0 | 284.1 | 284.0 |

The XPS results listed in Table III and IV indicate that oxidation of the gel surface takes place with this plasma treatment. It is completed already at 15 seconds (see O/Si and C/Si ratios in Table III). The Si 2p peak shifts in energy toward that of thermally grown SiO$_2$ (at 103.7eV).

Comparing now the 1:5 and 1:1 samples (the data is shown in Table IV) one can see a significant difference in degree of oxidation (102.9 and 102.5 eV in Si 2p state respectively) as well as in the O/Si ratios (6.76 and 5.72). These results indicate that oxidation proceeds faster in the 1:5 than in the 1:1 samples. This is very well correlated with the SEM results shown in FIG. 3.

Reactive oxygen plasma treatment of PDMS compounds has been reported. Chou et al., Appl. Phys. Lett. 46 (1), 31 (1985). It was established by means of XPS (X-Ray Photoelectron Spectroscopy) and TIR (total internal reflection IR- Spectroscopy) that the formation of a silicon oxide layer takes place.

Comparing the FIGS. 3(a) through (e) for the 1:1 sample and 3(k) for 1:5 sample one can see that the appearance of the $SiO_2$ layer and its formation cause a reaction in the surface of the gel which is much more pronounced in case of 1:5 than 1:1 sample. This reaction results in the wrinkling of the surface. It takes longer time for the 1:1 sample to respond than for the 1:5 sample, as the former has the highest viscous contribution among the samples represented (the 1:1.5 sample is an intermediate case). The 1:5 sample reacts faster as it has the highest elastic contribution. However, their degree of gelation according to Table I are not that different, which indicates that the range of 1:1 to 1:5 ratios represents a region between "elastomer" and "soft" gels. Lowering the A:B ratio by a factor of two results in termination of gelation.

The main reason for faster wrinkling is that formation of the $SiO_2$ layer proceeds faster in the 1:5 sample than in the 1:1 sample. The chemical state of the Si 2p peak is closer to that of thermally grown $SiO_2$ in 1:5 sample than in sample 1:1, 102.9 eV and 102.5 eV, respectively (see Table IV).

What is claimed is:
1. A solid state light modulator structure comprising:
   (a) a solid state charge storage device comprising an array of charge storage elements formed in a semiconductor substrate, each element associated with at least one display electrode on the surface of the substrate,
   (b) a deformable elastomer layer disposed on the solid state device, the layer covering the electrode array, and
   (c) a thin pellicle layer on the surface of the elastomer layer, and
   (d) a flexible, adherent and light reflective conductive metal layer disposed over the pellicle layer,
   characterized in that the elastomer layer is a silicon and oxygen containing gel, and the pellicle layer is a silicon oxide layer bonded directly to the gel layer.
2. The solid state light modulator of claim 1 in which the silicon and oxygen containing gel is polydimethyl siloxane.
3. The solid state light modulator of claim 1 in which the metal in the conductive metal layer is selected from the group consisting of silver, aluminum and indium.
4. The solid state light modulator of claim 3 in which the metal is silver.
5. The solid state light modulator of claim 4 in which the specular reflectance of the silver layer is at, least 90 percent.

* * * * *